United States Patent
Morgan et al.

(10) Patent No.: US 7,901,808 B2
(45) Date of Patent: Mar. 8, 2011

(54) SYSTEM AND METHOD FOR SEALING BATTERY SEPARATOR

(75) Inventors: Adam Morgan, Cottage Grove, MN (US); Ignacio Chi, Mahtomedi, MN (US); Brian L. Schmidt, White Bear Lake, MN (US); Benjamin J. Haasl, Forest Lake, MN (US); Jon Schell, Shoreview, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 1495 days.

(21) Appl. No.: 11/264,966

(22) Filed: Nov. 2, 2005

(65) Prior Publication Data

US 2007/0099071 A1    May 3, 2007

(51) Int. Cl.
*H01M 2/16* (2006.01)

(52) U.S. Cl. ......... 429/163; 429/144; 429/160; 429/181; 429/185; 429/211

(58) Field of Classification Search .................. 429/163, 429/160, 144, 181, 185, 211
See application file for complete search history.

(56) References Cited

U.S. PATENT DOCUMENTS

| | | | |
|---|---|---|---|
| 3,907,599 A | 9/1975 | Fanciullo et al. | |
| 4,028,479 A | 6/1977 | Fanciullo et al. | |
| 4,169,003 A | 9/1979 | Dangel et al. | |
| 4,659,636 A | 4/1987 | Suzuki et al. | |
| 4,964,877 A | 10/1990 | Keister et al. | |
| 5,147,737 A | 9/1992 | Post et al. | |
| 5,229,223 A | 7/1993 | Hyland | |
| 5,250,373 A | 10/1993 | Muffoletto et al. | |
| 5,312,458 A | 5/1994 | Muffoletto et al. | |
| 5,422,200 A | 6/1995 | Hope et al. | |
| 5,451,286 A | 9/1995 | Nyborg | |
| 5,458,997 A | 10/1995 | Crespi et al. | |
| 5,468,569 A | 11/1995 | Pyszczek et al. | |
| 5,486,215 A | 1/1996 | Kelm et al. | |
| 5,549,717 A | 8/1996 | Takeuchi et al. | |
| 5,916,335 A | 6/1999 | Gerhardt | |
| 6,006,133 A | 12/1999 | Lessar et al. | |
| 6,009,348 A | 12/1999 | Rorvick et al. | |

(Continued)

OTHER PUBLICATIONS

"U.S. Appl. No. 11/126,943, Notice of Allowance mailed Dec. 30, 2009", 7 pgs.
Machacek, Paul, et al., "Method and Apparatus For Concurrent Welding and Excise of Battery Separator", U.S. Appl. No. 11/126,943, filed May 11, 2005, 20 Pages.
"U.S. Appl. No. 11/126,943, Non-Final Office Action mailed Apr. 1, 2009", 6 pgs.

(Continued)

*Primary Examiner* — Jane Rhee
(74) *Attorney, Agent, or Firm* — Schwegman, Lundberg & Woessner, P.A.

(57) ABSTRACT

One embodiment of the present subject matter includes a battery having a stack of substantially planar battery electrodes, the stack including a first electrode including a first tab, and a second electrode including a second tab, with the first tab electrically connected to the second tab. The embodiment includes a first separator layer and a second separator layer sandwiching the first electrode, with the edges of the first separator layer and the second separator connected with a weld, the first separator layer and the second separator layer defining an interior space in which the first electrode is disposed, with the first tab extending outside the interior space. The embodiment includes an battery housing having electrolyte disposed therein, the housing including at least a first aperture and a feedthrough aperture; a lid conformed and sealed to the first aperture; and a feedthrough conformed and sealed to the feedthrough aperture.

33 Claims, 5 Drawing Sheets

U.S. PATENT DOCUMENTS

| | | | |
|---|---|---|---|
| 6,042,624 | A | 3/2000 | Breyen et al. |
| 6,118,652 | A | 9/2000 | Casby et al. |
| 6,225,778 | B1 | 5/2001 | Hayama et al. |
| 6,402,793 | B1 | 6/2002 | Miltich et al. |
| 6,508,901 | B2 | 1/2003 | Miller et al. |
| 6,819,544 | B1 | 11/2004 | Nielsen et al. |
| 6,881,516 | B2 | 4/2005 | Aamodt et al. |
| 7,000,665 | B2 | 2/2006 | Parker et al. |
| 7,135,254 | B2 | 11/2006 | Yun et al. |
| 7,479,349 | B2 | 1/2009 | O'Phelan et al. |
| 7,718,027 | B2 | 5/2010 | Machacek et al. |
| 2002/0124949 | A1 | 9/2002 | Fukuda et al. |
| 2003/0129488 | A1 | 7/2003 | Gross |
| 2004/0127952 | A1 | 7/2004 | O'Phelan et al. |
| 2005/0061426 | A1 | 3/2005 | Parker et al. |
| 2006/0081328 | A1 | 4/2006 | Parker et al. |

OTHER PUBLICATIONS

"U.S. Appl. No. 11/126,943, Notice of Allowance mailed Jan. 13, 2009", 7 pgs.

"U.S. Appl. No. 11/126,943, Response filed Sep. 1, 2009 to Non Final Office Action mailed Apr. 1, 2009", 9 pgs.

"U.S. Appl. No. 11/126,943, Response filed Oct. 21, 2008 to Restriction Requirement mailed Sep. 29, 2008", 7 pgs.

"U.S. Appl. No. 11/126,943, Restriction Requirement mailed Sep. 29, 2008", 6 pgs.

"U.S. Appl. No. 11/126,943, Examiner Interview Summary mailed Aug. 20, 2009", 4 pgs.

ature. In some embodiments, the battery housing is anodic. In some embodiments, the anode includes lithium laminated to nickel. Various embodiments further include positioning the battery housing, along with pulse generation electronics connected to the battery housing, in a hermetically sealed housing. In some embodiments, the cathode includes manganese dioxide pressed to a stainless steel wire-mesh. In some embodiments, a battery of the present subject matter is adapted to deliver from about 0.23 amp hours per cubic centimeter of battery housing volume to about 0.5 amp hours per cubic centimeter of battery housing volume. In some embodiments, a battery of the present subject matter is adapted to deliver from about 0.23 amp hours per cubic centimeter of battery housing volume to about 0.26 amp hours per cubic centimeter of battery housing volume. In some embodiments, a battery of the present subject matter is adapted to deliver from about 0.4 amp hours per cubic centimeter of battery housing volume to about 0.5 amp hours per cubic centimeter of battery housing volume.

SYSTEM AND METHOD FOR SEALING BATTERY SEPARATOR

CROSS REFERENCE TO RELATED APPLICATIONS

The present application is related to the following commonly assigned U.S. Patent Publication which is incorporated by reference in its entirety: "Batteries Including a Flat Plate Design," U.S. Patent Publication No. 2004/0127952, filed Feb. 7, 2003, which claims the benefit under 35 U.S.C 119(e) of U.S. Provisional Application Ser. No. 60/437,537 filed Dec. 31, 2002.

TECHNICAL FIELD

This disclosure relates generally to self-contained energy sources, and more particularly to a system and method for sealing battery separator.

BACKGROUND

Energy storage components, such as batteries and capacitors, are used in a variety of electronic devices. As technology evolves, devices using these components consistently demand smaller component sizes. Many new applications are not possible unless new component configurations are developed. Improved designs should meet or exceed current energy requirements.

But there are problems with providing smaller component sizes. Current designs are difficult to scale down without benefiting from design improvements. Further, improved design configurations are not possible without improved manufacturing processes. Improved designs should be space efficient. Better designs will not only offer more compact sizing, but will also offer performance enhancements. Improved manufacturing processes should enable construction of these new designs. These processes would offer more benefit if they produce components more efficiently.

SUMMARY

The above-mentioned problems and others not expressly discussed herein are addressed by the present subject matter and will be understood by reading and studying this specification.

One embodiment of the present subject matter includes a stack of substantially planar battery electrode layers, the stack including a first electrode layer including a first tab and a second electrode layer including a second tab, with the first tab electrically connected to the second tab; first and second separator layers sandwiching the first electrode layer, with the edges of the first and second separator layers connected with a welded portion of the first and second separator layers, the welded portion circumscribing the one or more non-tabbed edge portions of the first electrode layer; a seal connecting the first and second separator layers to the first tab; a battery housing including at least one feedthrough aperture; a feedthrough conformed and sealed to the feedthrough aperture; and electrolyte disposed in the battery housing, wherein the seal and the first and second separator layers are porous and adapted to resist ionic transport between the first electrode and the second electrode in a sealed state.

In various embodiments, the present subject matter includes separator layers including a microporous member including a polyethylene layer disposed between two polypropylene layers. Various embodiments additionally include applying tape around the tab. In some embodiments, the battery housing is anodic. In some embodiments, the anode includes lithium laminated to nickel. Various embodiments further include positioning the battery housing, along with pulse generation electronics connected to the battery housing, in a hermetically sealed housing. In some embodiments, the cathode includes manganese dioxide pressed to a stainless steel wire-mesh. In some embodiments, a battery of the present subject matter is adapted to deliver from about 0.23 amp hours per cubic centimeter of battery housing volume to about 0.5 amp hours per cubic centimeter of battery housing volume. In some embodiments, a battery of the present subject matter is adapted to deliver from about 0.23 amp hours per cubic centimeter of battery housing volume to about 0.26 amp hours per cubic centimeter of battery housing volume. In some embodiments, a battery of the present subject matter is adapted to deliver from about 0.4 amp hours per cubic centimeter of battery housing volume to about 0.5 amp hours per cubic centimeter of battery housing volume.

Additionally, in one embodiment, the present subject matter relates to a method, including positioning a first electrode layer between a bottom and top separator layer, the first electrode layer including a first tab, the bottom and top separator layer including porous polyethylene and porous polypropylene; positioning a sealing element adjacent the top layer and along the non-tabbed portions of the first electrode layer; sealing together the top and bottom separator layers with the sealing element; and sealing the tabbed portion of the first electrode layer to the top and bottom separator layers.

Additionally, in one embodiment, the present subject matter relates to a system, including one or more electrode layers; separator means for insulating the electrode layer means, for providing ionic transport between the one or more electrode layers, and for sealing the one or more electrode layers from ionic transport when heated to a predetermined melting temperature; and a sealing element for welding the separator means into a bag in which at least one electrode is disposed.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their legal equivalents.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

Self-powered electronic devices are known. For example, self-powered implantable medical devices are now in use for treating a variety of diseases. Implantable pulse generation devices, as well as other types of implantable medical devices, are powered by a battery contained within the housing of the device. The present subject matter includes battery embodiments suitable for use in implantable medical devices. The present subject matter extends to other applications as well.

Batteries include various subcomponents. For example, various batteries include opposing anode and cathode plates. These electrode subcomponents are isolated by separator. Separator is porous to accommodate electrolyte adapted to sustain ionic transfer between the electrodes.

Some separator includes subcomponents intended to reduce or eliminating ionic transfer between electrodes. Some examples include meltable separator. Some separator examples include three layers of porous separator material, configured such that the center material melts and clogs the pores of the external layers, reducing ionic transfer. To ensure that ionic transfer between the anode and the cathode is reduced, in some embodiments, the present subject matter includes separator bags enveloping a battery electrode. In some embodiments, the bag envelops a battery anode. In additional embodiments, the bag envelops a battery cathode. Bag embodiments cover a large amount of ionic paths between anodes and cathodes, and as such provide a useful battery configuration, adapted to reduce ionic transfer upon reaching a temperature sufficient to melt the center material of the separator.

Figure 1A:
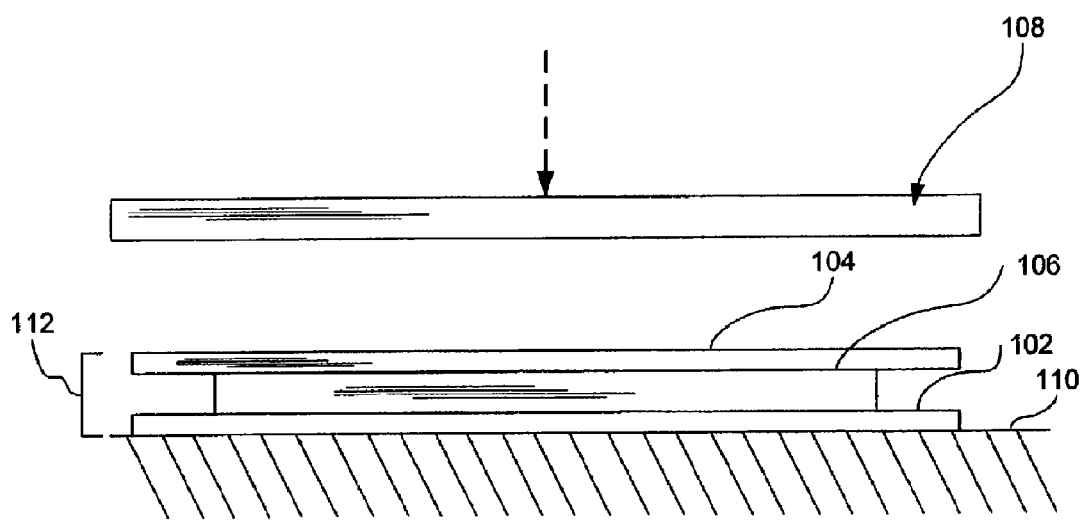
FIG. 1A is a schematic representing the front view of a system for sealing power source components, according to one embodiment of the present subject matter.

FIG. 1A represents a front view of a system for sealing power source components, according to one embodiment of the present subject matter. In various embodiments, the system includes a sealing element 108, and a stack including a top separator layer 104, an electrode 106, and a bottom separator layer 102. In various embodiments, the bottom 102 and top 104 layers are polymeric.

In various embodiments, one or more of the bottom 102 and top 104 layers include a porous membrane. In some of these embodiments, the membrane is microporous. In some embodiments, the membrane includes polyethylene material. Some embodiments of the present subject matter include polypropylene material. Various embodiments within the present subject matter include a polyethylene layer disposed between two polypropylene layers.

In various embodiments, the polyethylene material of the membrane has a predetermined melting temperature of from about 100° C. to about 140° C. In various embodiments, the polyethylene material has a predetermined melting temperature of around 134° C. In various embodiments, the polypropylene material has a predetermined melting temperature ranging from about 107° C. to about 170° C. In various embodiments, the polypropylene material has a predetermined melting temperature of about 166° C.

In various embodiments, the calculated porosity of the membrane has a typical value of around 40%. In various embodiments, the average pore size is approximately 0.09 micrometers by approximately 0.04 micrometers.

In various embodiments, the average air permeability, as measured using a Gurley densometer, is from about 18 seconds to about 28 seconds. In various embodiments, the average air permeability is from about 20 seconds to about 28 seconds. In various embodiments, the average air permeability is from about 18 seconds to about 24 seconds. In some embodiments, the average air permeability is around 20 seconds.

Average thickness for the membrane, in various embodiments, ranges from around 18 micron to about 22 micron. In some embodiments, the average thickness is approximately 25 micron. Average thickness for the membrane, in various embodiments, ranges from around 22.5 micron to about 27.5 micron. In some embodiments, the average thickness is approximately 25 micron. In some embodiments, the membrane has a tensile strength of around 1900 kg/cm$^2$. In some embodiments, the membrane has a tensile strength of around 2000 kg/cm$^2$.

It is noted that in some embodiments using polypropylene and polyethylene, when heated to the predetermined melting temperature of the polyethylene, the pores of the polypropylene layers are clogged with polyethylene without the polypropylene itself reaching its predetermined melting temperature. In various embodiments, this function can work to reduce ionic transfer across the membrane, thereby reducing chemical reactions which reduce heat. As such, embodiments of the present subject matter provide a membrane which reduces ionic transfer in high heat conditions, resulting in reduced ionic transfer, and therefore reduced operating temperatures. Various embodiments include layers available under the brand name CELGARD. CELGARD is a product of Celgard LLC, of Charlotte, N.C. 28273. Other separator layers, including additional materials, are within the scope of the present subject matter.

In various embodiments, the electrode 106 is an anode. In additional embodiments, the electrode 106 is a cathode. In various embodiments, the electrode 106 is substantially planar. The electrodes of the present subject matter are useful in various applications. Some applications are batteries. Examples of batteries falling within the scope of the present subject matter include, but are not limited to, embodiments disclosed at paragraphs 0225-0258 of the following related and commonly assigned U.S. Patent Publication, "Batteries Including a Flat Plate Design," U.S. Patent Publication No. 2004/0127952, filed on Feb. 7, 2003, incorporated herein by reference. Some embodiments include a battery anode which is a substantially planar layer of lithium. The present subject matter is not limited to lithium, however, and other battery materials are within the scope of the present subject matter. In various embodiments, the battery electrode, when viewed from the top, can have any shape, including rectangular shapes, circular shapes, and irregular shapes. Various embodiments of the present subject matter demonstrate a sheet shape. These electrode shapes are provided for explanation, but other shapes are possible.

One battery embodiment of the present subject matter additionally uses one or more cathode electrodes. In various embodiments, the cathode can include manganese dioxide. Various embodiments include manganese dioxide coated to a stainless steel wire-mesh collector. In some embodiments the manganese dioxide is pressed to the stainless steel wire-mesh. Additional embodiments include other forming operations for attaching manganese dioxide to a current collector. Other embodiments using other materials suitable for use as a current collector are additionally possible. Some cathode embodiments are sheet shaped. Other cathode materials and configurations additionally fall within the scope of the present subject matter.

In various embodiments, the top separator 104, the electrode 106, and the bottom separator 102 are placed into a battery subcomponent stack 112. In various embodiments, this positioning can occur by hand, or by using a controlled positioning system. In various embodiments, the stack is put into alignment using a pick and place operation. In various embodiments, the pick and place operation is aided by visual alignment.

In various embodiments, the battery subcomponent stack 112 rests on a working surface 110. A working surface, in various embodiments, includes one or more vacuum sources. For example, in one embodiment, a plurality of vacuum ports positioned on working surface 110 hold the bottom separator 102 in positing during processing steps.

The illustration shows a state of operation wherein the sealing element 108 is incident unto the battery subcomponent stack 112. In various embodiments, the present subject matter includes positioning a sealing element 108 against the top layer 104. In alternate embodiments, the sealing element is fixed to a first static working surface, and a second working surface sandwiches the top and bottom polymeric separator layers and anode between the sealing element and the second working surface. Additional fixture configurations capable of positioning the top and bottom layer together and sealing them together are within the scope of the present subject matter.

Figure 1B:
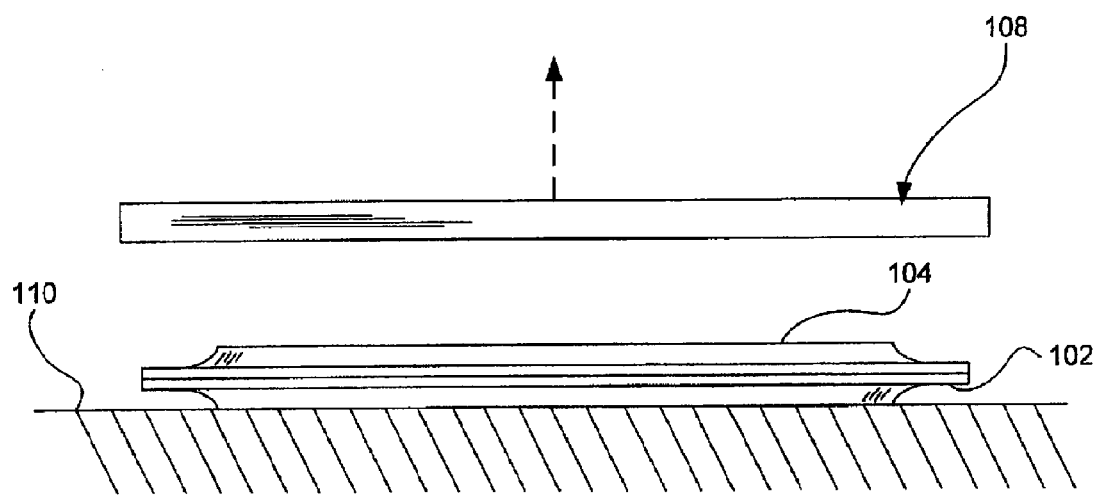
FIG. 1B is a schematic representing the front view of a system for sealing power source components, according to one embodiment of the present subject matter.

FIG. 1B is a schematic representing the front view of a system for sealing power source components, according to one embodiment of the present subject matter. The illustration shows components after processing with sealing element 108. In various processing embodiments, the sealing element 108 has been positioned against the top separator layer 104. Additionally, in various embodiments, the sealing element 108 and the top separator layer 104 are pressed against the bottom separator layer 102. In some embodiments, this is accomplished with a press. The sealing element 108, in various embodiments, welds portions of the top separator layer 104 and the bottom separator layer 102 together. In various embodiments, the sealing element 108 is electrically heated and applies heat to the top 104 and bottom 102 separator layers creating a welded portion of the top 104 and bottom 102 separator layers. In additional embodiments, the sealing element 108 applies pressure to the top 104 and bottom 102 separator layers creating a welded portion of the top 104 and bottom 102 separator layers. In some embodiments, sealing element 108 concurrently presses together the top and bottom separator layers, creating a welded portion of the top 104 and bottom 102 separator layers. Some embodiments use laser welding to seal the top 104 and bottom 102 separator layers together. These sealing processes are examples of the sealing processes within the scope of the present subject matter. Additional embodiments can vary the sequence by adding or subtracting additional steps.

The illustration shows an electrode disposed in a bag shaped separator configuration. The bag is defined by welded portions of the bottom 102 and top 104 separator layers. The components rest on working surface 110. The bag can completely enclose the electrode, in various embodiments. In additional embodiments, the bag can provide one or more apertures which provide access to the electrode disposed in the bag from a position outside of the volume surrounded by the bag.

Various embodiments of the present subject matter include applying a pressure and an electrical current to the sealing element 108 such that top and bottom 102 separator layers are sealed together along a welded portion. A welded portion can circumscribe the electrode 106, or can partially surround the electrode, in various embodiments. In some embodiments, the electrode has one or more tabs, and the welded portion circumscribes the one or more non-tabbed portions of the electrode.

In various embodiments, the present subject matter uses a sealing element connected to a thermal impulse heating fixture. In various embodiments, pressure application and heating are provided by a single fixture. Various fixture embodiments of the present subject matter include controllers which have impulse heating circuitry. One example of a controller within the scope of the present subject matter includes an impulse heating controller manufactured by ROPEX of 74321 Bietigheim-Bissingen, Germany.

In various embodiments, the sealing element 108 is attached to a fixture at mounting eyelets. In various embodiments, the fixture is adapted to a sealing requirement by varying the duration and intensity of the heat provided by the sealing element. Additionally, pressure used by the machine is variable and dependent on an application, in various embodiments.

Various embodiments of the present subject matter include excising excess material from a first and second separator layer along a welded portion joining the first and second separator layers. In various embodiments, excising excess material from the bag includes a laser excise.

Figure 2:
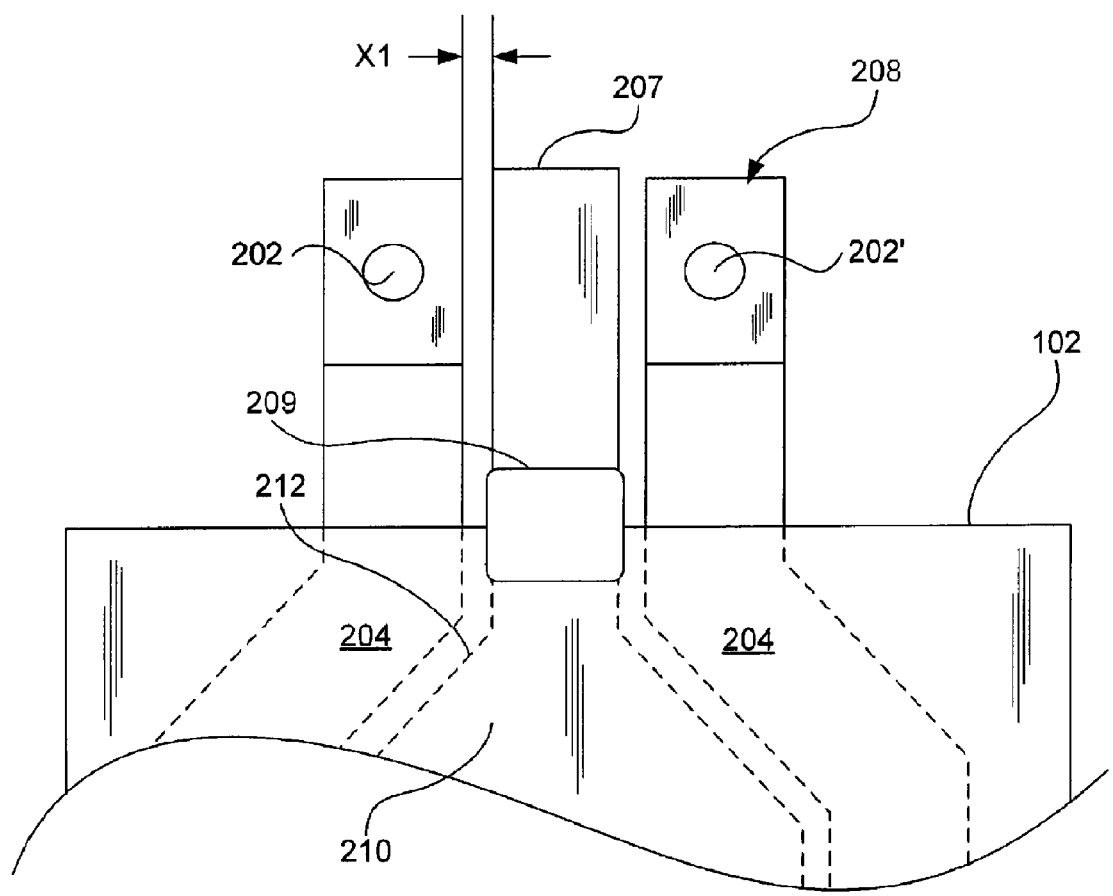
FIG. 2 is a partial bottom view of a sealing element and separator layers, according to one embodiment of the present subject matter.

FIG. 2 is a partial bottom view of a sealing element and separator layers, according to one embodiment of the present subject matter. In various embodiments, the electrode is disposed between a top and bottom 102 separator layer. In various embodiments, the sealing element 208 is shaped for positioning offset from and outside of the perimeter of the battery electrode 210. For example, in some embodiments, a sealing surface 204 is shaped such that it is able to press the layers together by contacting one layer along an area extending along and outside the electrode 210. In one example, the sealing element is offset by a distance of X1. In various embodiments, offset X1 is about 0.022 inches. In additional embodiments, X1 ranges from about 0.000 to about 0.052 inches. In additional embodiments, the offset X1 is about 0.015 inches. Additionally, in various embodiments, the offset X1 ranges from about 0.000 inches to about 0.030 inches.

In various embodiments, welded top and bottom 102 separator layers define a bag. For example, the illustrated configuration results in a bag which has an opening through which a tab 207 of the battery electrode 210 can extend. In some embodiments, the sealing element 208 includes mounting eyelets 202, 202'. In some of these embodiments, the mounting eyelets 202, 202' are located proximal the opening in the separator bag.

In various embodiments, the sealing element welds together portions of the top and bottom 102 separator layers such that the welded portions define fully enclosed bags. In some embodiments, the welding element welds together portions of top and bottom 102 separator layers along non-tabbed portions of the electrode. In embodiments having one tab, the welded portion will define a bag having a single aperture. In embodiments including electrodes with multiple tabs, the welded portion will define a bag having multiple apertures. The illustrated embodiment has a sealing element 208 shaped to allow for the exit of tab 207.

Additionally pictured in the embodiment is film 209. Film 209 provides several benefits. In various embodiments, film 209 provides for a seal between the top and bottom separator layers and the tab. The seal reduces ionic transport between the active electrode material and other electrodes, in various embodiments. Additionally, in various embodiments, film 209 provides a protective bumper insulating tab 207 from one or more adjacent layers. For example, in various embodiments, the electrode 210 is sized such that, when the electrode 210 is in a subcomponent stack, it has a perimeter 212 which is within the perimeter of an adjacent electrode, but for the protrusion of tab 207. In this embodiment, burrs on the adjacent electrode could cut through separator in areas proximal tab 207. As such, in various embodiments, the placement of film 209 reduces instances of burrs contacting tab 207.

In various embodiments, the film 209 includes polyimide material. In some embodiments, film 209 includes an adhesive. Some embodiments include a silicone adhesive. Other materials additionally fall within the present scope, however, including adhesives and resins which are not connected to a non-adhesive component.

Figure 3:
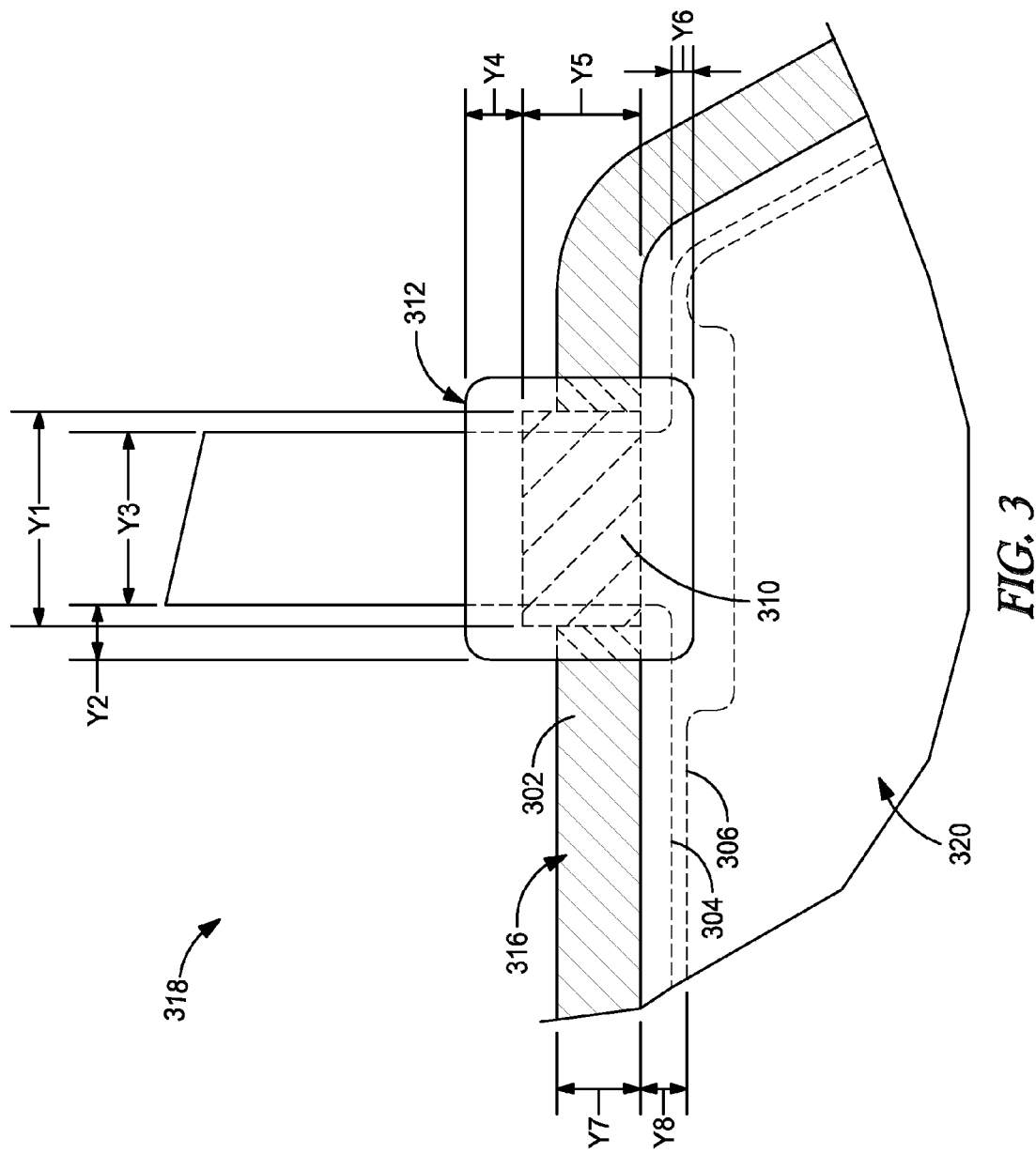
FIG. 3 is a partial top view of a battery electrode and separator, according to one embodiment of the present subject matter.

FIG. 3 is a partial top view of a battery electrode and separator, according to one embodiment of the present subject matter. The embodiment includes an electrode subcomponent 318, including an electrode 320, and separator 316. The separator comprises a first and second layer sealed together along welded portion 302. The first and second layer form a bag in which electrode 320 is disposed. The embodiment additionally includes an opening 310 which is defined by absence of a welded portion of the first and second separator layers. Although the portion of separator illustrated at the opening 310 extends beyond (away from lithium 306) the perimeter of sealed separator 316, embodiments were it does not extend past the perimeter are also within the scope of the present subject matter.

The electrode 320, in this and additional embodiments, includes a nickel collector 304, and a lithium patch 306. The lithium patch 306, in this and various additional embodiments, is pressed onto the nickel collector 304. In various embodiments, the lithium patch 306 is pressed to both sides of the nickel collector 304. The lithium patch has a perimeter, illustrated with hidden lines, which is offset from the opening 310, in various embodiments. This configuration provides several benefits. One benefit is that, while in a stack with other electrodes, film 312 does not stack with other films and create a high spot in an electrode stack.

In various embodiments, dimension Y1 is about 0.095 inches. Additionally, in various embodiments, dimension Y1 ranges from about 0.065 inches to about 0.125 inches. In various embodiments, dimension Y2 is about 0.025 inches. Additionally, in various embodiments, dimension Y2 ranges from about 0.015 inches to about 0.035 inches. In various embodiments, dimension Y3 is about 0.075 inches. In various embodiments, dimension Y4 ranges from about 0.000 inches to about 0.010 inches. In various embodiments, dimension Y5 is about 0.050 inches. Additionally, in various embodiments, dimension Y5 ranges from about 0.020 inches to about 0.080 inches. In various embodiments, dimension Y6 is about 0.010 inches. Additionally, in various embodiments, dimension Y6 ranges from about 0.000 inches to about 0.020 inches. In various embodiments, dimension Y7 is about 0.035 inches. In various embodiments, dimension Y7 from about 0.000 inches to about 0.050 inches. Additionally, in various embodiments, dimension Y8 is about 0.022 inches.

Figure 4:
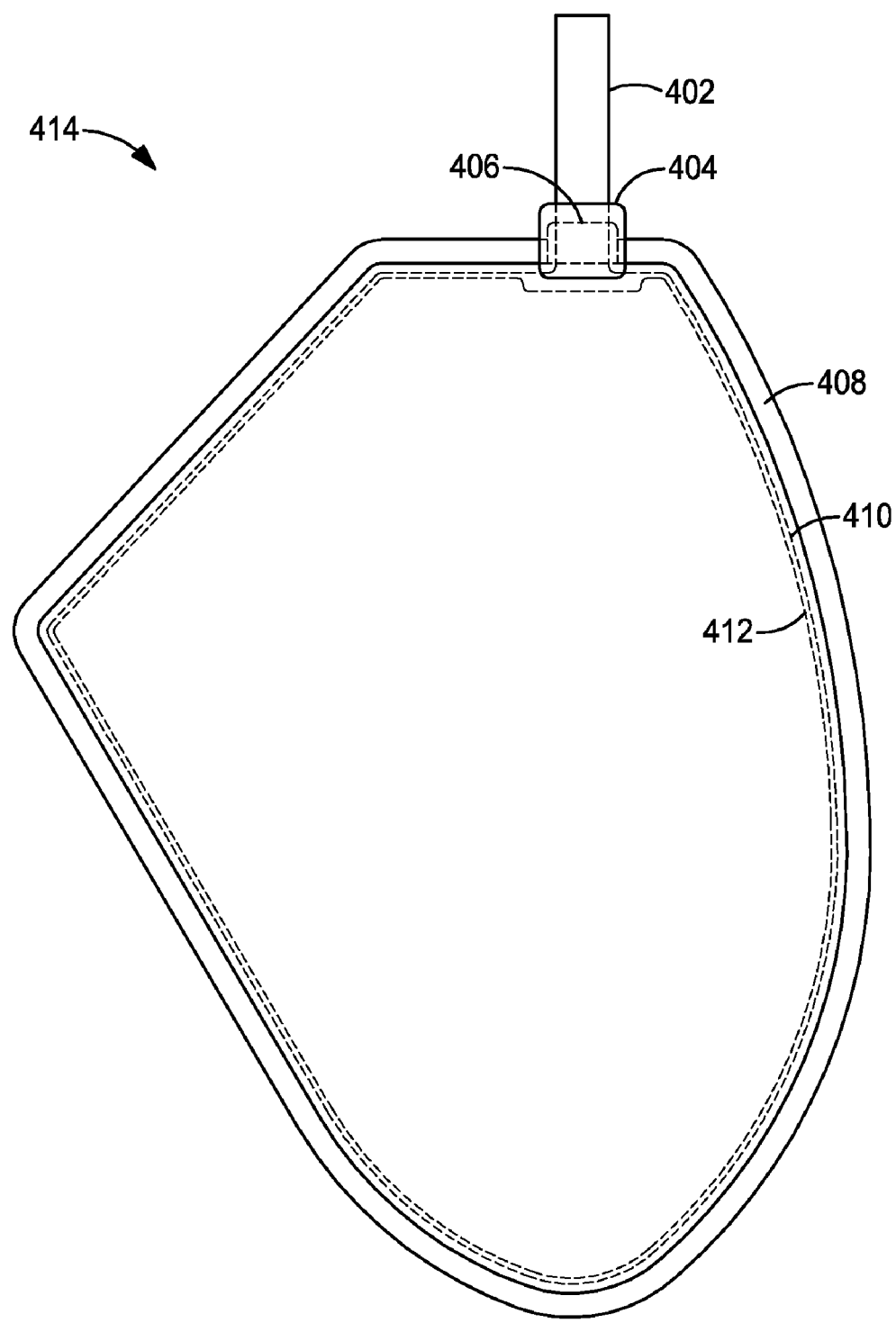
FIG. 4 is a top view of a battery electrode and separator, according to one embodiment of the present subject matter.

FIG. 4 is a top view of a battery electrode and separator, according to one embodiment of the present subject matter. Illustrated is a tab 402, seal 404, opening 406, a continuous welded portion 408, a collector 410, and an active material 412. The collector 410 is nickel in some embodiments, but the present subject matter includes additional materials. The active material 412 is anodic lithium in some embodiments, but the present subject matter includes additional materials. The perimeter of the welded portion of the separator 408 demonstrates an irregular shape, which, in various embodiments, is useful for positioning the electrode assembly 414 into an irregular shaped package. An irregular shaped package, in various embodiments, can increase packaging efficiency of a battery in various application embodiments.

Figure 5:
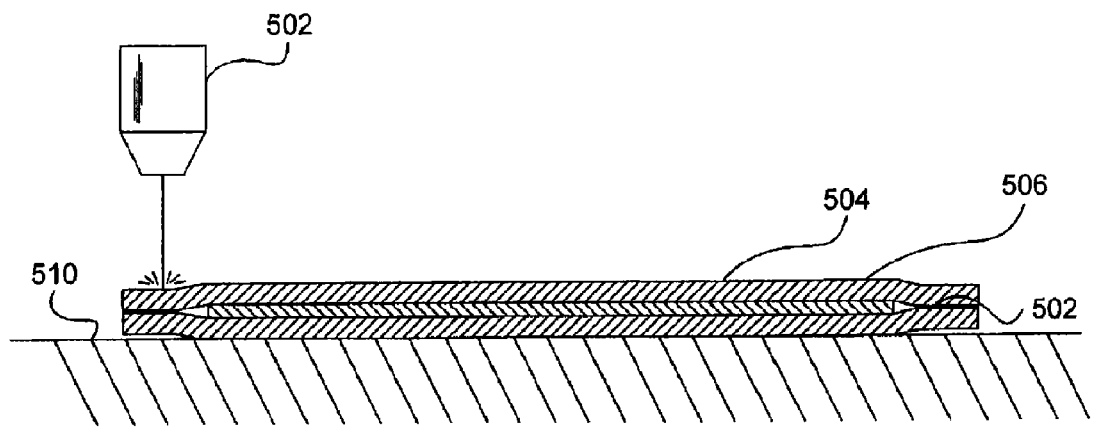
FIG. 5 is a cross section of a battery electrode disposed between a first and second separator layer, according to one embodiment of the present subject matter.

FIG. 5 is a cross section of a battery electrode disposed between a first and second separator layer, according to one embodiment of the present subject matter. The illustration shows one method of welding a top separator 504 to a bottom separator 502, to at least partially enclosed electrode 506 in a bag shaped receptacle. In various embodiments, the top 504 and bottom 502 separators rest on a working surface 510, and are welded with a laser 502. In some process embodiment of the present subject matter, the laser power is adjusted to simultaneously provide for welding and for excise of materials along the weld.

Application

In various embodiments, a battery of the present subject matter is substantially flat. Some flat battery embodiments include a plurality of battery electrodes stacked together. In various embodiments, a stack of substantially planar battery electrodes includes a first electrode including a first tab, and a second electrode including a second tab, with the first tab connected to the second tab. In various embodiments, the stack includes a first separator layer and a second separator layer sandwiching the first electrode, with the edges of the first separator layer and the second separator connected with a welded portion to define a bag shaped receptacle. In various embodiments, the first tab extends outside the interior space of the bag shaped receptacle.

Various embodiments include a battery housing. In various embodiments, the battery housing has at least a first aperture through which a battery stack can pass during assembly. Various embodiments additionally include a feedthrough aperture. In various embodiments, a lid is conformed and sealed to the first aperture. In various embodiments, a feedthrough is conformed and sealed to the feedthrough aperture. In various embodiments, the feedthrough includes epoxy. In various embodiments, the battery housing is titanium. In additional embodiments the battery housing includes aluminum. Various embodiments include battery housings which are conductive. Additional embodiments include battery housings which are nonconductive. In various embodiments, the lid includes titanium. In additional embodiments, the battery housing includes aluminum. In various embodiments, electrolyte is disposed in the battery housing. In various embodiments, the electrolyte is an organic compound.

In various embodiments, a flat battery has a battery capacity density of from about 0.23 amp hours per cubic centimeter of flat battery to about 0.5 amp hours per cubic centimeter of flat battery. In some embodiments, the battery is adapted to deliver from about 0.23 amp hours per cubic centimeter of battery housing volume to about 0.26 amp hours per cubic centimeter of battery housing volume. Additional embodiments include a battery adapted to deliver from about 0.4 amp hours per cubic centimeter of battery housing volume to about 0.5 amp hours per cubic centimeter of battery housing volume. In various embodiments, battery capacity density is measured by dividing the amp-hour rating of the battery by the battery housing volume, in various embodiments. Depending on the discharge rate required in an application, and on the voltage at discharge in the application, various battery capacity densities are used. The present subject matter includes, but is not limited to, embodiments disclosed at paragraphs 0095-0110, 0136-0196, 0206-0258 of the following related and commonly assigned U.S. Patent Publication, "Batteries Including a Flat Plate Design," U.S. Patent Publication No. 2004/0127952, filed on Feb. 7, 2003, incorporated herein by reference.

Various embodiments additionally include positioning the battery housing, along with pulse generation electronics connected to the battery housing, into a housing. In various embodiments, the housing is hermetically sealed. Various embodiments of the housing include a first opening sized for passage of the battery housing and pulse generation electronics, with a housing lid sealably conformed to the first opening.

These batteries, along with optional components, are used in implantable medical devices in varying embodiments. Some battery embodiments are adapted for use in cardiac rhythm management devices. Some of these embodiments use a battery adapted to deliver from about 0.4 amp hours per cubic centimeter of battery housing volume to about 0.5 amp hours per cubic centimeter of battery housing volume. Some battery embodiments are adapted for use in implantable cardioverter defibrillators. Some of these embodiments use a battery adapted to deliver from about 0.23 amp hours per cubic centimeter of battery housing volume to about 0.26 amp hours per cubic centimeter of battery housing volume.

Although specific embodiments have been illustrated and described herein, it will be appreciated by those of ordinary skill in the art that any arrangement which is calculated to achieve the same purpose may be substituted for the specific embodiment shown. This application is intended to cover adaptations or variations of the present subject matter. It is to be understood that the above description is intended to be illustrative, and not restrictive. Combinations of the above embodiments, and other embodiments will be apparent to those of skill in the art upon reviewing the above description. The scope of the present subject matter should be determined with reference to the appended claims, along with the full scope of equivalents to which such claims are entitled.

We claim:

1. An apparatus, comprising:
a stack of substantially planar battery electrode layers, the stack including a first electrode layer including a first tab and a second electrode layer including a second tab, with the first tab electrically connected to the second tab;
first and second separator layers sandwiching the first electrode layer, with the edges of the first and second separator layers connected with a welded portion of the first and second separator layers, the welded portion circumscribing one or more non-tabbed edge portions of the first electrode layer defining an opening through which the first tab extends;
a seal including a film disposed over the opening and connecting the first and second separator layers about the first tab;
a battery housing including at least one feedthrough aperture;
a feedthrough conformed and sealed to the feedthrough aperture; and
electrolyte disposed in the battery housing,
wherein the first and second separator layers are each adapted to melt to resist ionic transport at a predetermined melting temperature.

2. The apparatus of claim 1, wherein the battery housing is anodic.

3. The apparatus of claim 1, wherein the battery housing is cathodic.

4. The apparatus of claim 1, wherein the first electrode includes one tab, and a continuous welded portion.

5. The apparatus of claim 1, wherein the first and second separator layers each include a first porous material which includes polyethylene and a second porous material which includes polypropylene.

6. The apparatus of claim 5, wherein the polyethylene has a predetermined melting temperature of around 134° C.

7. The apparatus of claim 5, wherein the polypropylene has a predetermined melting temperature of around 166° C.

8. The apparatus of claim 5, wherein the first and second separator layers each include a polyethylene layer disposed between two polypropylene layers.

9. The apparatus of claim 8, wherein the first and second separator layers each have a porosity of around 40%.

10. The apparatus of claim 1, wherein the seal includes tape.

11. The apparatus of claim 10, wherein the tape includes polyimide film.

12. The apparatus of claim 11, wherein the tape includes silicon based adhesive.

13. The apparatus of claim 1, wherein the first electrode layer is an anode.

14. The apparatus of claim 13, wherein the anode includes lithium.

15. The apparatus of claim 14, wherein the anode includes a nickel substrate onto which the lithium is laminated.

16. The apparatus of claim 1, wherein the first electrode layer is a cathode.

17. The apparatus of claim 16, wherein the cathode includes manganese dioxide.

18. The apparatus of claim 17, wherein manganese dioxide is disposed on a stainless steel wire-mesh.

19. The apparatus of claim 1, wherein the apparatus is adapted to deliver from about 0.23 amp hours per cubic centimeter of battery housing volume to about 0.5 amp hours per cubic centimeter of battery housing volume.

20. The apparatus of claim 19, wherein the apparatus is adapted to deliver from about 0.23 amp hours per cubic centimeter of battery housing volume to about 0.26 amp hours per cubic centimeter of battery housing volume.

21. The apparatus of claim 19, wherein the apparatus is adapted to deliver from about 0.4 amp hours per cubic centimeter of battery housing volume to about 0.5 amp hours per cubic centimeter of battery housing volume.

22. The apparatus of claim 1, further comprising a piece of tape applied to the top and bottom of the separator layer around the first tab.

23. The apparatus of claim 1, wherein the feedthrough is coupled to the stack.

24. The apparatus of claim 2, wherein the feedthrough is electrically coupled to a cathode of the stack and electrically isolated from an anode of the stack.

25. The apparatus of claim 3, wherein the feedthrough is electrically coupled to an anode of the stack and electrically isolated from a cathode of the stack.

26. The apparatus of claim 1, wherein the weld includes an impulse heat weld.

27. The apparatus of claim 13, wherein the seal includes a tape, and a first anodic material is disposed on an anodic substrate, with the tape disposed on the substrate and the anodic material disposed on the substrate away from the tape.

28. The apparatus of claim 27, wherein the anodic material comprises a lithium patch, and the substrate is formed of nickel.

29. The apparatus of claim 28, wherein the lithium patch is pressed to both sides of the substrate.

30. The apparatus of claim 27, wherein the welded portion defines an opening, and the first anodic material is disposed from the opening at a selected distance.

31. An apparatus, comprising:
- a stack of substantially planar lithium battery electrode layers, the stack including a first lithium anode layer including a lithium patch disposed on a substrate, the first lithium anode layer including a first tab, the stack including a second anode layer including a second tab, with the first tab electrically connected to the second tab;
- first and second separator layers sandwiching the first anode layer, with the edges of the first and second separator layers connected with a welded portion of the first and second separator layers, the welded portion circumscribing one or more non-tabbed edge portions of the first electrode layer defining an opening through which the first tab extends;
- a seal including a film disposed over the opening and connecting the first and second separator layers about the first tab;
- a cathodic battery housing including at least one feedthrough aperture;
- a feedthrough conformed and sealed to the feedthrough aperture, with the feedthrough electrically coupled to the first anode layer and electrically isolated from the cathodic battery housing; and
- electrolyte disposed in the battery housing,
- wherein the first and second separator layers are each adapted to melt to resist ionic transport at a predetermined melting temperature, wherein the welded portion defines an opening with the lithium patch disposed from the opening at a selected distance and wherein the apparatus is adapted to deliver from about 0.23 amp hours per cubic centimeter of battery housing volume to about 0.5 amp hours per cubic centimeter of battery housing volume.

32. The apparatus of claim 31, wherein the stack includes a cathode layer that includes cathode manganese dioxide disposed on a stainless steel wire-mesh.

33. The apparatus of claim 31, wherein the first lithium anode layer includes a lithium patch pressed onto two sides of a substrate that includes nickel.

* * * * *